(12) United States Patent
Zeng et al.

(10) Patent No.: US 10,074,870 B2
(45) Date of Patent: Sep. 11, 2018

(54) BATTERY WITH PERFORATED CONTINUOUS SEPARATOR

(71) Applicant: MICROSOFT TECHNOLOGY LICENSING, LLC, Redmond, WA (US)

(72) Inventors: Dongli Zeng, Fremont, CA (US); Tzu-Yuan Lin, San Jose, CA (US); John Christopher Collins, San Jose, CA (US); Vijayasekaran Boovaragavan, Cupertino, CA (US); Michael Nikkhoo, Saratoga, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/237,455

(22) Filed: Aug. 15, 2016

(65) Prior Publication Data
US 2018/0048013 A1  Feb. 15, 2018

(51) Int. Cl.
*H01M 10/04* (2006.01)
*H01M 2/16* (2006.01)
*H01M 2/18* (2006.01)

(52) U.S. Cl.
CPC ..... *H01M 10/0459* (2013.01); *H01M 2/1653* (2013.01); *H01M 2/18* (2013.01)

(58) Field of Classification Search
None
See application file for complete search history.

(56) References Cited

U.S. PATENT DOCUMENTS

| 2,279,318 | A | 4/1942 | Hilger et al. |
| 3,907,603 | A | 9/1975 | Kocherginsky et al. |
| 4,052,541 | A | 10/1977 | von Krusenstierna |
| 4,110,191 | A | 8/1978 | Specht et al. |
| 4,267,243 | A | 5/1981 | Park et al. |
| 4,687,717 | A | 8/1987 | Kaun et al. |
| 4,855,196 | A | 8/1989 | Eggers |

(Continued)

FOREIGN PATENT DOCUMENTS

| EP | 0484295 A1 | 5/1992 |
| WO | 2012137188 A1 | 10/2012 |

OTHER PUBLICATIONS

Shuster, et al., "Development of an Advanced Dimensionally Stable Separator for Rechargeable Lithium-Metal Disulfide Batteries", In Proceedings of IEEE 35th International Power Sources Symposium, Jun. 22, 1992, pp. 354-357.

(Continued)

*Primary Examiner* — Barbara Lee Gilliam
*Assistant Examiner* — Wyatt P McConnell
(74) *Attorney, Agent, or Firm* — Alleman Hall Creasman & Tuttle LLP

(57) ABSTRACT

Examples disclosed herein relate to a continuous separator having perforations to help reduce or prevent wrinkling of the separator when producing curved electrode stacks. One example provides a battery comprising a plurality of discontinuous electrode layers, and a continuous separator separating the discontinuous electrode layers, the continuous separator having perforations extending at least partially through a depth of the continuous separator in a folded region of the continuous separator.

19 Claims, 5 Drawing Sheets

(56) References Cited

U.S. PATENT DOCUMENTS

| | | | | |
|---|---|---|---|---|
| 5,460,904 | A | * | 10/1995 | Gozdz ........................ C08J 9/28 |
| | | | | 429/162 |
| 5,478,668 | A | | 12/1995 | Gozdz et al. |
| 6,887,620 | B2 | | 5/2005 | Klein et al. |
| 2002/0055037 | A1 | | 5/2002 | Rhoten |
| 2004/0229116 | A1 | | 11/2004 | Malinski et al. |
| 2006/0088759 | A1 | * | 4/2006 | Roh ........................ H01M 2/16 |
| | | | | 429/128 |
| 2010/0203394 | A1 | | 8/2010 | Bae et al. |
| 2012/0121965 | A1 | | 5/2012 | Makino et al. |
| 2015/0372340 | A1 | | 12/2015 | Taylor et al. |

OTHER PUBLICATIONS

"International Search Report and Written Opinion Issued in PCT Application No. PCT/US2017/046181", dated Sep. 19, 2017, 10 Pages.

* cited by examiner

BATTERY WITH PERFORATED CONTINUOUS SEPARATOR

BACKGROUND

Electronic devices may utilize batteries to power various electrical components. A battery includes a pair of electrodes, and a separator that separates the electrodes. Ionic current is conducted through the separator via an electrolyte within the separator. Some batteries include multiple electrode pairs housed in a same package.

SUMMARY

Examples are disclosed that relate to a continuous separator having perforations to help lessen wrinkling of the separator when producing curved batteries. One example provides a battery comprising a plurality of discontinuous electrode layers, and a continuous separator separating the discontinuous electrode layers. The continuous separator has perforations extending at least partially through a depth of the continuous separator in a folded region of the continuous separator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, some batteries may include multiple electrode pairs arranged in a same housing. The electrodes may be arranged in a stacked configuration in which they are separated via a continuous separator arranged in a rolled, zig-zag, or otherwise folded configuration. In such a configuration, the separator has folded regions along its length between electrodes (e.g. in regions where it is not positioned between electrodes of an electrode pair).

The housing of such batteries may have a flat, thin, rectangular configuration in which the electrode stack is arranged. While such batteries may fit well in flat, rectangular devices (e.g. smart phones), the shape may be more difficult to fit into a curved device. One possible solution may be to utilize a plurality of smaller flat batteries that each individually fit within the curved form factor. However, such a configuration may take up more space than a single battery, and may require additional manufacturing steps. Thus, another possible solution is to bend a flat battery into a desired curved shape. However, bending of such electrode stacks may introduce wrinkles in the folded regions on the continuous separator. This may result in points of weakness, gaps into the electrode stack, and other structural issues, and thus may increase a likelihood of battery damage.

Accordingly, examples are disclosed herein that relate to continuous separators having perforations to help reduce the risk of wrinkling when forming a curved battery. The perforations may be formed in folded regions of a continuous separator to accommodate the bending of the separator during curved battery formation. The disclosed examples may be readily integrated with existing manufacturing processes for producing batteries.

Figure 1:
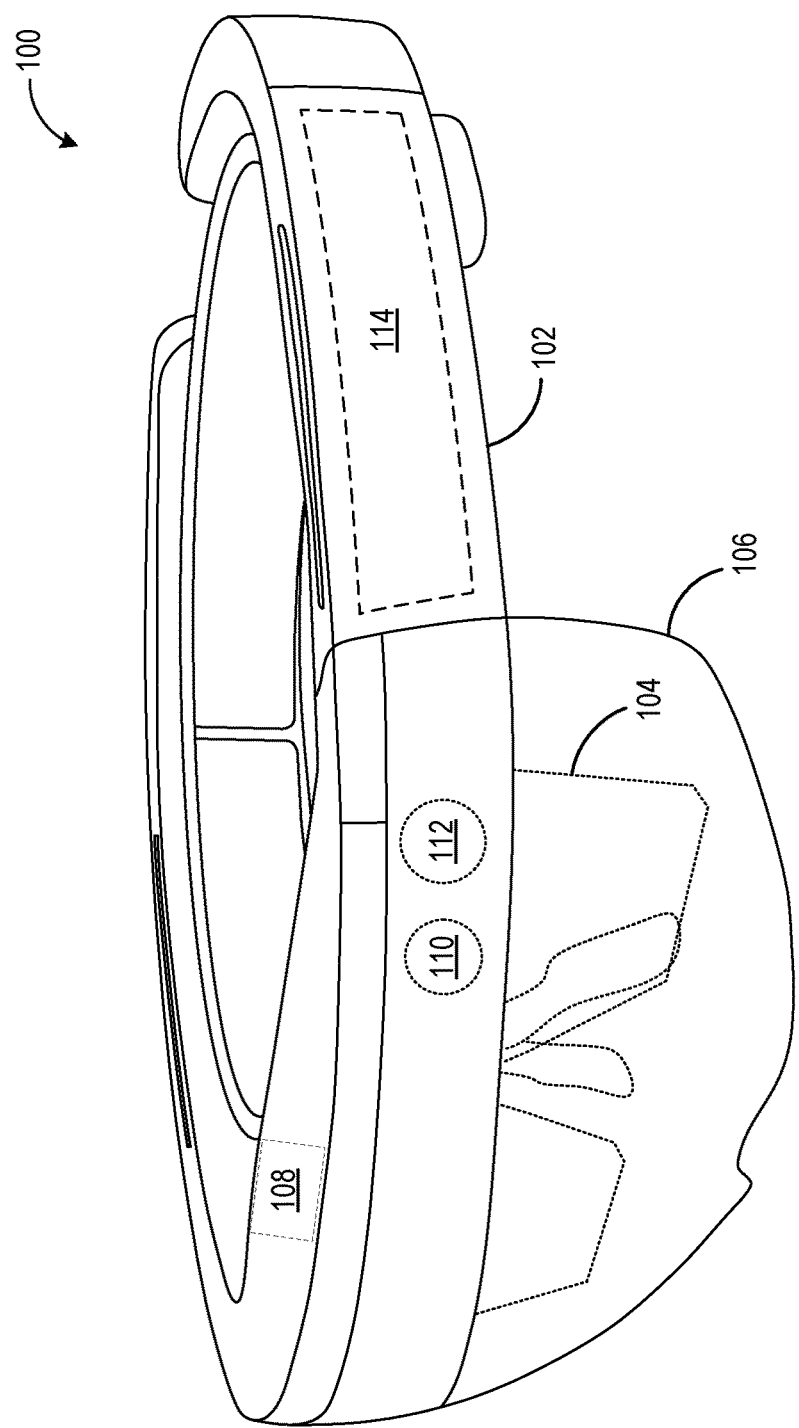
FIG. 1 shows an example device having a curved battery.

FIG. 1 shows an example head-mounted display device 100 comprising a curved battery. Head-mounted display device 100 includes a frame 102 in the form of a band wearable around a head of user that supports see-through display componentry positioned near the user's eyes. Head-mounted display device 100 may utilize augmented reality technologies to enable simultaneous viewing of virtual display imagery and a real world background. As such, head-mounted display device 100 is configured to generate virtual images via see-through display 104. See-through display 104 may take any suitable form, such as a waveguide or prism configured to receive a generated image and direct the image towards a wearer's eye. See-through display 104 may utilize any suitable light source for generating images, such as one or more laser diodes. Head-mounted display device 100 further includes an additional see-through optical component 106, shown in FIG. 1 in the form of a see-through veil positioned between see-through display 104 and the background environment as viewed by a wearer.

Head-mounted display device 100 further includes a controller 108 operatively coupled to see-through display 104 and to other display components. Controller 108 includes one or more logic devices and one or more computer memory devices storing instructions executable by the logic device(s) to enact functionalities of the head-mounted display device 100. Head-mounted display device 100 may further include various other components, for example a two-dimensional image camera 110 (e.g. a visible light camera and/or infrared camera) and a depth camera 112, as well as other components that are not shown, including but not limited to eye-gaze detection systems (e.g. one or more light sources and eye-facing cameras), speakers, microphones, accelerometers, gyroscopes, magnetometers, temperature sensors, touch sensors, biometric sensors, other image sensors, a communication facility, a GPS receiver, etc.

Head-mounted display device 100 further comprises one or more batteries, an example of which is shown as battery 114. Battery 114 has a curved configuration to fit within the curved shape of frame 102. As described above, battery 114 comprises a plurality of electrode layers separated by a continuous separator having a serpentine path that passes between each electrode pair. Use of a continuous separator may help to save manufacturing time and costs compared to the use of individual separators. It will be understood that device 100 is presented for the purpose of example and not intended to be limiting, and that a curved battery may be used in any suitable device.

Figure 2:
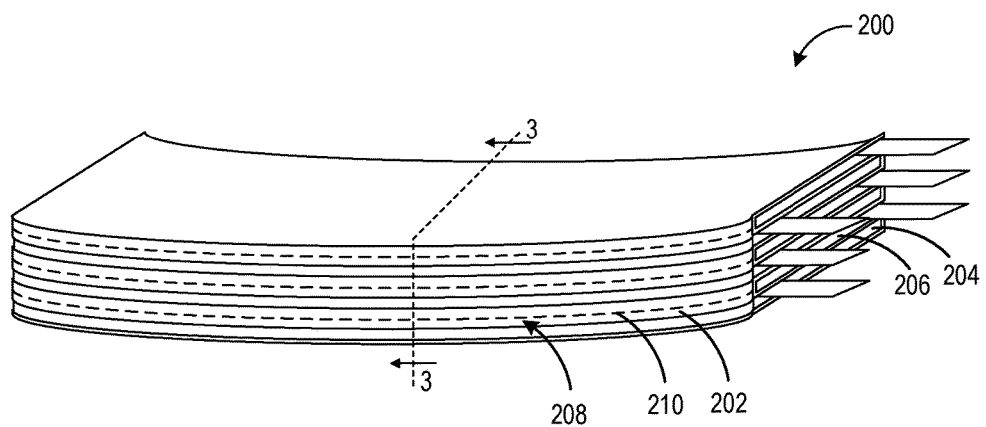
FIG. 2 shows an example curved electrode stack of a curved battery.
Figure 3:
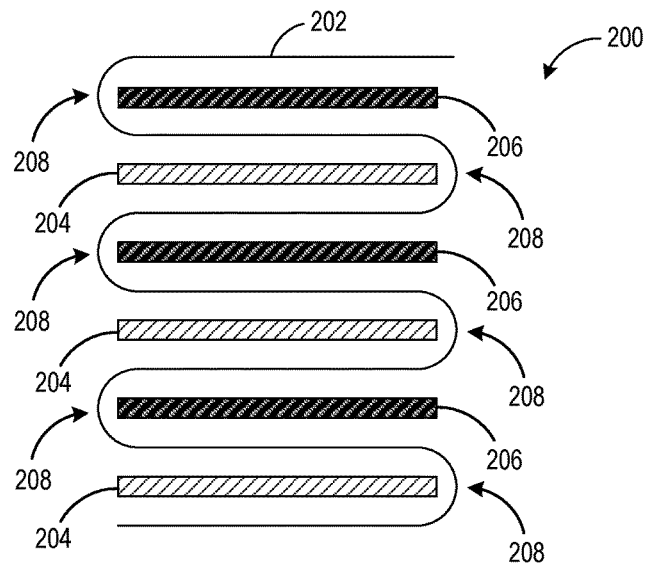
FIG. 3 shows a cross section of the example curved electrode stack of FIG. 2 taken along line 3-3.

FIG. 2 illustrates an example curved electrode stack 200 with discontinuous electrode layers separated by a perforated continuous separator 202, and FIG. 3 shows a cross section of the electrode stack 200 taken along line 3-3 of FIG. 2. The discontinuous electrode layers include stacked layers of anodes 204 and cathodes 206. The continuous separator 202 extends between adjacent electrode layers and over top and bottom electrode layers in a zig-zag path. Perforations are illustrated as dashed lines at folded regions 208 of the separator, such as that dashed line 210.

Figure 4:
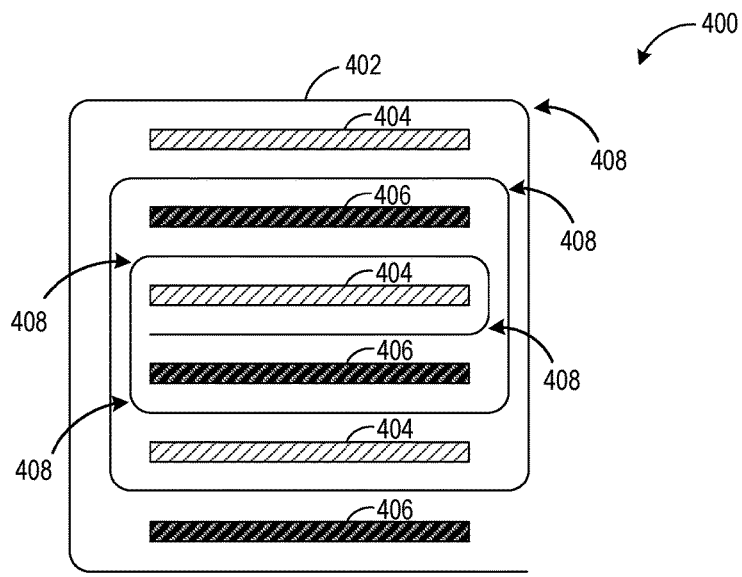
FIG. 4 shows a cross section of another example curved electrode stack.

In other examples, the separator may be folded in any other suitable configuration than zig-zag. FIG. 4 depicts a cross-section of another electrode stack 400 including discontinuous electrode layers of anodes 404 and cathodes 406. In contrast to the configuration of FIG. 3, the continuous separator 402 is folded in a rolled configuration. The continuous separator 402 may similarly be perforated (not shown in FIG. 4) at one or more folded regions 408.

Figure 5:
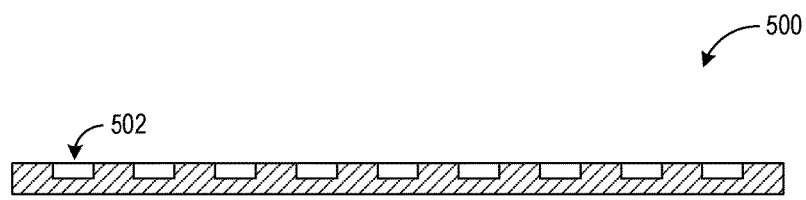
FIG. 5 shows a schematic cross section of an example continuous separator having partial depth perforations.
Figure 6:
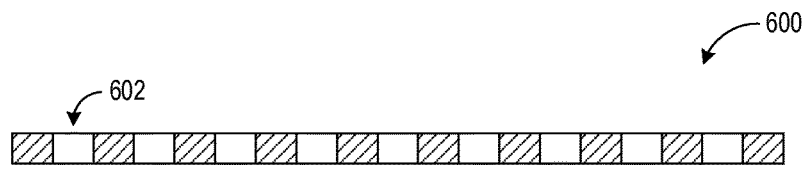
FIG. 6 shows a schematic cross section of an example continuous separator having full depth perforations.

Perforations in folded regions of a continuous separator may have any suitable configuration. The size and shape of perforations may depend upon the configuration of a particular battery, on materials used to form the separator and other battery components, and/or on any other suitable factors. FIG. 5 shows a cross sectional view of a separator 500 taken along a direction in which a fold is to be formed (e.g. along a left-to-right direction of the electrode stack of FIG. 2). In this example, the perforations 502 extend partially through a depth of the continuous separator 500, and are substantially similar in length and depth along the separator. In contrast, FIG. 6 shows a cross sectional view of an example continuous separator 600 having perforations 602 that extend fully through the depth of the continuous separator 600. It will be understood that these examples are not limiting, and that perforations may have any other suitable configuration. Perforations may have a constant width as a function of the perforation depth, or may have a variable width along the depth (e.g. such that the perforations have a V-shaped or other suitable variable cross sectional profile).

Figure 7:
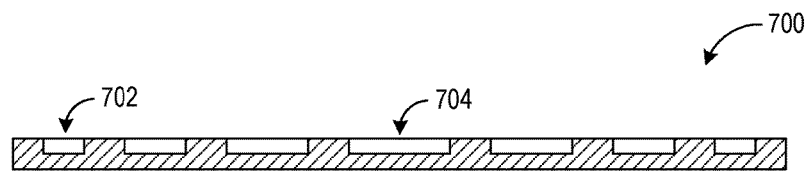
FIG. 7 shows a schematic cross section of an example continuous separator having perforations of varying length.

In some examples, perforations along a folded region of a continuous separator may vary in dimension as a function of a position on the separator and/or a position within the battery. For example, the variations may be graded along one or more directions of the separator and/or battery, or may vary in a different manner. FIG. 7 shows a cross section of an example continuous separator 700 having perforations that vary in length as a function of position. Here, a perforation 702 near an outer edge of the folded region has a shorter length than that of a perforation 704 near a center of the folded region, with perforations of increasing length in between. In other examples, perforations may vary in length in an oppositely graded configuration, in which perforations near the center of the folded region are shorter in length than perforations near the outer edges, or in an ungraded manner.

Figure 8:
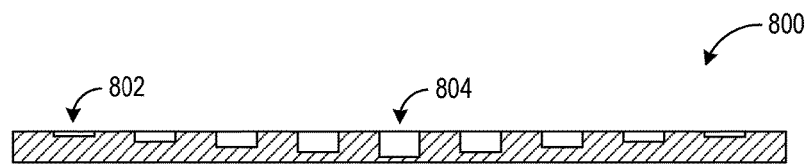
FIG. 8 shows a schematic cross section of a continuous separator having perforations of varying depth.

As another example, FIG. 8 shows a cross section of a continuous separator 800 having perforations that vary in depth along a folded region. In this example, a perforation 802 near an outer edge of the folded region is shallower in depth relative to a perforation 804 near the center. In other examples, perforations may vary in depth in any other suitable manner.

As mentioned above, dimensions of perforations in a continuous separator also may vary based on a position of the perforations in an electrode stack. For example, perforations along a folded region near a middle layer of an electrode stack may be larger in size and/or depth than perforations along folded regions near outer layers of the electrode stack, or vice versa.

Figure 9:
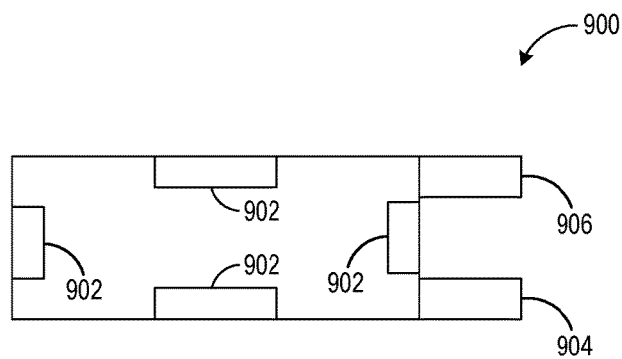
FIG. 9 shows an example electrode stack having securing elements.

In some examples, one or more securing elements may be coupled with an electrode stack to secure the stack to an outer package and/or to secure adjacent electrode stack layers together, and thus to help prevent movement of battery structures relative to one another after assembly. FIG. 9 shows a top-down view of an example electrode stack 900 having securing elements 902 coupled with the electrode stack 900. Securing elements 902 are configured to positionally fix the discontinuous electrode layers, e.g. one or more anode(s) 904 and one or more cathode(s) 906 relative to the continuous separator. The securing elements may take any suitable form. In some examples, the securing elements may take the form of an applied adhesive, adhesive tape, or other adhesive structure, while in other examples a mechanical securing mechanism may alternatively or additionally be used. It will be understood that FIGS. 2-9, are schematic in nature, and that relative dimensions of parts may be distorted for illustrative purposes.

Figure 10:
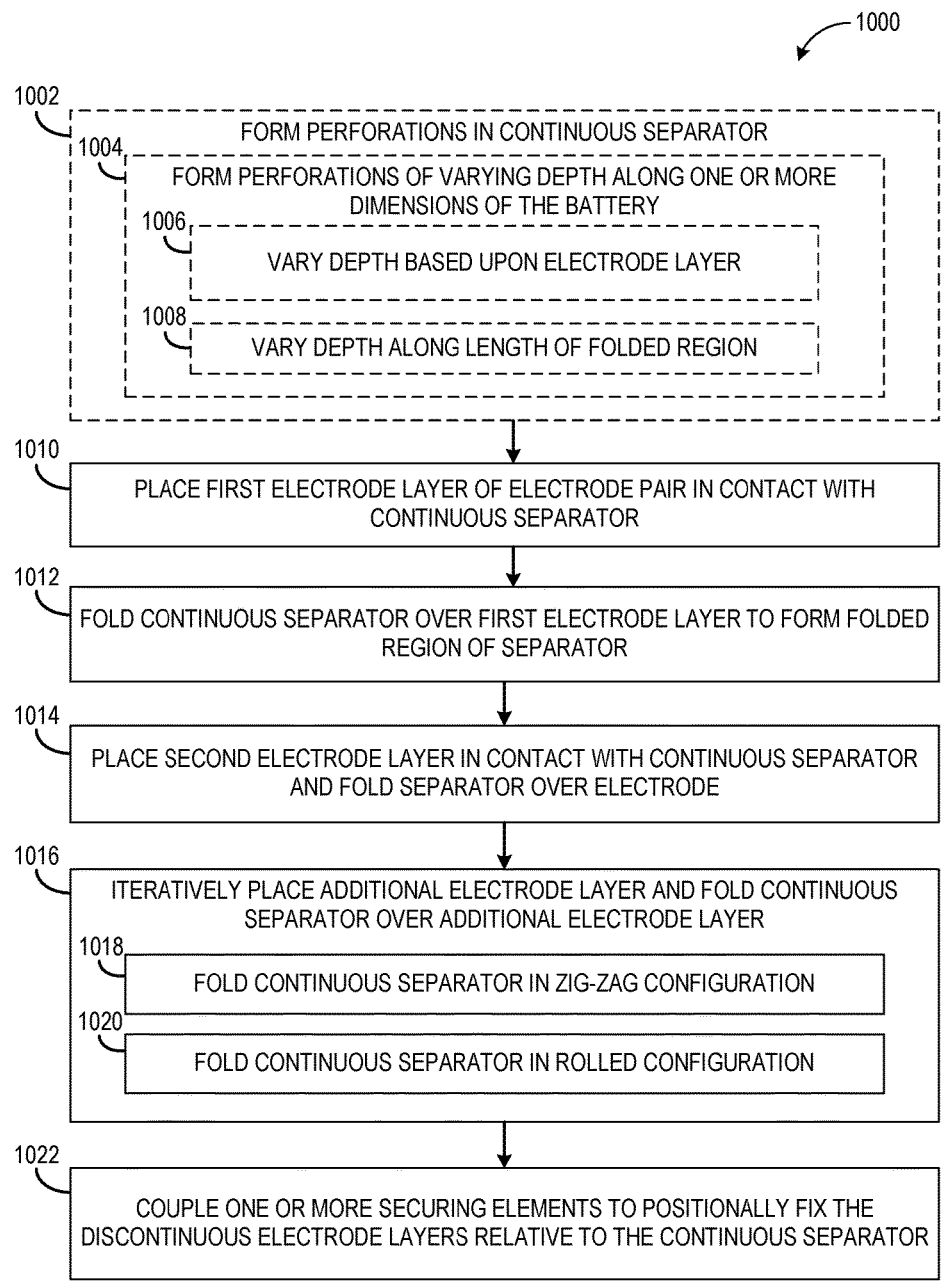
FIG. 10 shows an example method of forming a battery having discontinuous electrode layers and a continuous separator.

FIG. 10 shows an example method of forming a battery having discontinuous electrode layers and a continuous separator having perforations in folded regions. In some examples, a pre-perforated separator may be obtained, while in other examples, perforations may be formed during the electrode stack assembly process. As such, method 1000 optionally includes, at 1002, perforating the continuous separator. The perforations are formed along areas of the continuous separator that will become folded regions during assembly of an electrode stack. The perforations may be formed in any suitable manner, such as via laser-cutting, machine needling, die-cutting, stamping, imprinting, and molding, wherein the method used to form the perforations may depend upon the material of the separator. Examples of suitable materials for the separator include polymer membranes such as polypropylene and polyethylene.

The perforations may have any suitable configuration. In some examples, the perforations may be substantially uniform. In other examples, the perforations may be of varying dimension. Further, in some examples, perforations may extend entirely through the separator, while in other examples, perforations may extend partially through a depth of the continuous separator in the folded region. Further, the perforations may have a variable configuration, as shown at 1004. As examples, the perforations may vary based upon a layer within the electrode stack of the folded region, as shown at 1006, or a location along a length of the folded region, as shown at 1008.

Method 1000 further includes, at 1010, placing a first electrode layer of an electrode pair in contact with the continuous separator, and at 1012, folding the continuous separator over the first electrode layer to form the folded region of the continuous separator. Method 1000 further includes, at 1014, placing a second electrode layer of the electrode pair onto the continuous separator such that the continuous separator is positioned between the first electrode layer and the second electrode layer, and then folding the separator over the second electrode.

Method 1000 further includes, at 1016, iteratively placing another electrode on the continuous separator and folding the continuous separator over the electrode layer, such that the continuous separator is positioned between electrodes of each of a plurality of additional electrode pairs in an electrode stack. The continuous separator may be folded in a zig-zag configuration, at 1018, or in a rolled configuration, at 1020. As described above, FIGS. 3 and 4 respectively show examples of a continuous separator in a zig-zag configuration and in a rolled configuration. In some examples, each of these folds includes perforations, while in other examples perforations may be formed in a subset of folded regions.

Method 1000 may also include coupling one or more securing elements with the electrode layers to positionally fix the discontinuous electrode layers relative to the continuous separator, at 1022. Any suitable securing elements may be used, such as adhesive and mechanical elements. In other examples, such securing elements may be omitted.

Another example provides a battery comprising a plurality of discontinuous electrode layers, and a continuous separator separating the discontinuous electrode layers, the continuous separator having perforations extending at least partially through a depth of the continuous separator in a folded region of the continuous separator. Additionally or alternatively, the perforations in the continuous separator may vary in configuration along a length of the folded region. Additionally or alternatively, the perforations in the folded region of the continuous separator may vary in configuration based upon a location within the battery of the folded region. The continuous separator may additionally or alternatively be folded in a zig-zag configuration. The continuous separator may additionally or alternatively be folded in a rolled configuration. The battery may additionally or alternatively be curved. The battery may additionally or alternatively include one or more securing elements configured to positionally fix the discontinuous electrode layers relative to the continuous separator.

Another example provides a method of forming a battery comprising discontinuous electrode layers and a continuous separator, the method comprising placing a first electrode layer of an electrode pair in contact with the continuous separator, folding the continuous separator over the first electrode layer to form a folded region of the continuous separator, the continuous separator comprising one or more perforations extending at least partially through a depth of the continuous separator in the folded region, and placing a second electrode layer of the electrode pair onto the continuous separator such that the continuous separator is positioned between the first electrode layer and the second electrode layer. The method may additionally or alternatively include perforating the continuous separator prior to folding the continuous separator. Perforating the continuous separator may additionally or alternatively include forming perforations of varying depth along one or more dimensions of the battery. Forming perforations of varying depth may additionally or alternatively include varying a depth of perforations based upon a location within the battery of the folded region, or may additionally or alternatively include varying a depth of perforations along a length of the folded region. The continuous separator may additionally or alternatively include pre-formed perforations. The method may additionally or alternatively include folding the continuous separator at a plurality of locations to extend between each electrode pair of a plurality of electrode pairs in an electrode stack. Folding the continuous separator may additionally or alternatively include folding the continuous separator in a zig-zag configuration. Folding the continuous separator may additionally or alternatively include folding the continuous separator in a rolled configuration. The method may additionally or alternatively include coupling one or more securing elements to positionally fix the discontinuous electrode layers relative to the continuous separator.

Another example provides a battery comprising a plurality of discontinuous electrode layers, and a continuous separator separating the discontinuous electrode layers, the continuous separator having perforations extending at least partially through a depth of the continuous separator in a plurality of folded regions of the continuous separator, the perforations varying in configuration along one or more dimensions. The perforations in the continuous separator may additionally or alternatively vary in configuration along a length of each of the folded regions of the continuous separator. The perforations in the folded regions of the continuous separator may additionally or alternatively vary in configuration based upon a location within the battery of each of the folded regions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A battery comprising:
  a plurality of discontinuous electrode layers; and
  a continuous separator separating the discontinuous electrode layers, the continuous separator having a linear arrangement of perforations extending at least partially through a depth of the continuous separator, the linear arrangement of perforations extending along a folded region of the continuous separator, and the continuous separator having non-folded regions without linear arrangements of perforations between the discontinuous electrode layers,
  wherein the battery comprises a curved shape having a curvature extending along a direction of the linear arrangement of perforations, the linear arrangement of perforations being configured to avoid wrinkling of the continuous separator in the folded region due to the curvature.

2. The battery of claim 1, wherein the perforations in the continuous separator vary in configuration along a length of the folded region.

3. The battery of claim 1, wherein the perforations in the folded region of the continuous separator vary in configuration based upon a location within the battery of the folded region.

4. The battery of claim 1, wherein the continuous separator is folded in a zig-zag configuration.

5. The battery of claim 1, wherein the continuous separator is folded in a rolled configuration.

6. The battery of claim 1, further comprising one or more securing elements configured to positionally fix the discontinuous electrode layers relative to the continuous separator.

7. A method of forming a curved battery comprising discontinuous electrode layers and a continuous separator, the method comprising:

placing a first electrode layer of an electrode pair in contact with the continuous separator;

folding the continuous separator over the first electrode layer to form a folded region of the continuous separator, the continuous separator comprising a linear arrangement of perforations extending at least partially through a depth of the continuous separator, the linear arrangement of perforations extending along the folded region and along a direction of curvature of the curved battery to avoid wrinkling of the continuous separator in the folded region due to the curvature, and the continuous separator having non-folded regions without linear arrangements of perforations between the discontinuous electrode layers; and placing a second electrode layer of the electrode pair onto the continuous separator such that the continuous separator is positioned between the first electrode layer and the second electrode layer.

8. The method of claim 7, further comprising perforating the continuous separator prior to folding the continuous separator.

9. The method of claim 8, wherein perforating the continuous separator comprises forming perforations of varying depth along one or more dimensions of the battery.

10. The method of claim 9, wherein forming perforations of varying depth comprises varying a depth of perforations based upon a location within the battery of the folded region.

11. The method of claim 9, wherein forming perforations of varying depth comprises varying a depth of perforations along a length of the folded region.

12. The method of claim 7, wherein the continuous separator comprises pre-formed perforations.

13. The method of claim 7, further comprising folding the continuous separator at a plurality of locations to extend between each electrode pair of a plurality of electrode pairs in an electrode stack.

14. The method of claim 13, wherein folding the continuous separator comprises folding the continuous separator in a zig-zag configuration.

15. The method of claim 13, wherein folding the continuous separator comprises folding the continuous separator in a rolled configuration.

16. The method of claim 7, further comprising coupling one or more securing elements to positionally fix the discontinuous electrode layers relative to the continuous separator.

17. A battery comprising:
a plurality of discontinuous electrode layers; and
a continuous separator separating the discontinuous electrode layers, the continuous separator having a linear arrangement of perforations extending at least partially through a depth of the continuous separator along each of a plurality of folded regions of the continuous separator, the perforations varying in configuration along one or more dimensions, and the continuous separator having non-folded regions without linear arrangements of perforations between the discontinuous electrode layers,
wherein the battery comprises a curved shape having a curvature extending along a direction of the linear arrangement of perforations, the linear arrangement of perforations being configured to avoid wrinkling of the continuous separator in the folded regions due to the curvature.

18. The battery of claim 17, wherein the perforations in the continuous separator vary in configuration along a length of each of the folded regions of the continuous separator.

19. The battery of claim 17, wherein the perforations in the folded regions of the continuous separator vary in configuration based upon a location within the battery of each of the folded regions.

* * * * *